Figure 1:
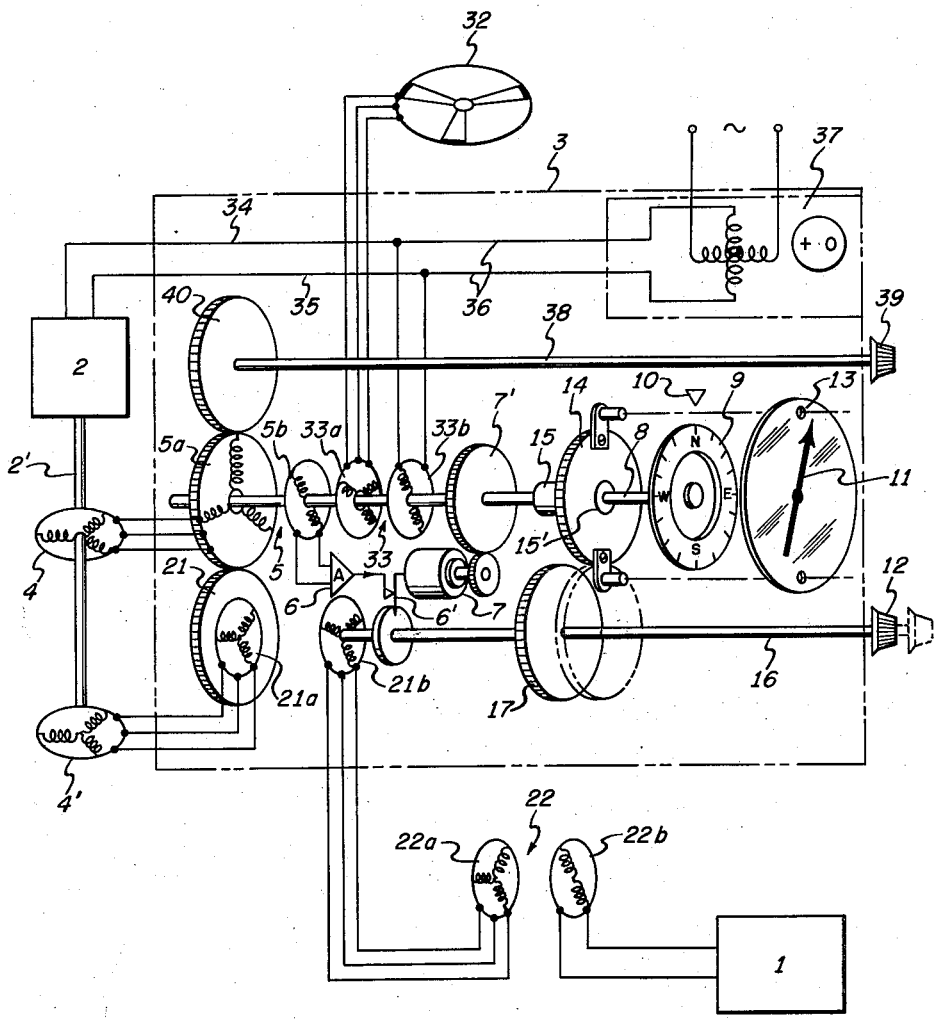

Jan. 24, 1961  F. DOVE  2,969,208
NAVIGATION AND AUTOMATIC CONTROL APPARATUS FOR AIRCRAFT
Filed June 21, 1957  3 Sheets-Sheet 1

INVENTOR
FRANK DOVE
BY
ATTORNEY

2,969,208

NAVIGATION AND AUTOMATIC CONTROL APPARATUS FOR AIRCRAFT

Frank Dove, St. Albans, England, assignor to The Sperry Gyroscope Company Limited, Brentford, England, a British company Filed June 21, 1957, Ser. No. 668,278

Claims priority, application Great Britain June 22, 1956

13 Claims. (Cl. 244—77)

This invention relates to aircraft navigation apparatus of the kind including an automatic pilot capable of automatically controlling the steering of an aircraft at least about the azimuth axis, a heading indicating instrument on the instrument panel of the servo-operated repeater-compass type, an azimuth reference gyroscope providing data concerning the aircraft's heading, which data is not only supplied to the repeater compass but is used by the automatic pilot in controlling the steering of the aircraft, means associated with the repeater compass for indicating in relation to the card or other moving indicating means of the compass a desired course to be steered, and means adapted to be operated by a single manually operated member for simultaneously and correspondingly adjusting the course indicating means and setting the automatic pilot to fly the craft on the course indicated by the desired-course indicating means.

In a known form of apparatus of the kind specified, the desired-course indicating means is adjustably set into a fixed angular relation with the servo operated shaft of the repeater compass and the heading demanded of the automatic pilot is determined by the angular relation between the repeater compass shaft and a member associated with the desired-course indicating means and automatically set into a corresponding fixed angular relation to the shaft when the desired-course indicating means is adjusted. The data supplied to the automatic pilot for use in controlling the steering of the aircraft is a measure of the angular relation between the adjustable member and the instrument casing. Any error in the angular position of the servo-operated shaft, such as is due to lag, or hunting, affects not only the reading of the repeater compass but the course steered by the automatic pilot.

According to the present invention, in aircraft navigation apparatus of the kind specified, the data supplied to the automatic pilot for use in controlling the steering of the aircraft is a function of data supplied by the azimuth reference gyroscope and of the position of a course demanding member adjustably set into a fixed position in relation to the instrument casing (or to the aircraft structure), which fixed position determines the aircraft course demanded of the automatic pilot.

The means for indicating the desired course to be steered may be adjustable into a fixed relation with respect to the craft whereby a reference mark on the desired-course indicating means is aligned with a mark on the movable indicating means of the repeater compass when the desired course is being steered. Preferably, however, the means associated with the repeater compass for indicating a desired course to be steered comprises a set-heading indicator carrying a pointer or other reference mark which is adjustable into a fixed angular relation with the rotatable shaft of the repeater compass, means being included for moving the course-demanding member into a position corresponding to the relative angular position of the set-heading indicator and the repeater compass shaft. Conveniently, a graduated compass card is mounted on the shaft of the repeater compass in fixed relation thereto whereby the pointer of the set-heading indicator indicates by its relation to the card the course demanded, or to be demanded, of the automatic pilot, while a lubber line fixed in relation to the craft is provided which indicates by its relation to the card the course being steered, whereby the pointer is aligned with the lubber line when the demanded course is being correctly steered and the compass is reading correctly.

In one embodiment of the invention there is provided means for temporarily connecting the set-heading indicator mechanically to the course-demanding member whereby the set-heading indicator and course-demanding member can move only by amounts corresponding respectively to equal changes of course, means for adjusting the indicator and member when so connected, means for preventing rotation of the repeater compass shaft with respect to the instrument casing (or aircraft structure) during the period that the indicator and member are mechanically connected, and means for preventing the indicator and member from being readily adjusted when not mechanically connected.

Another embodiment includes an intermediate member adapted to be moved into a position corresponding to the relative angular position of the set-heading indicator and the repeater compass shaft, and servo means responsive to the position of the intermediate member adapted when energized to move the course demanding member into a position in relation to the instrument casing (or aircraft structure) which corresponds to the position of the intermediate member. The said position of the intermediate member may be referred to the repeater compass shaft. Preferably, however, the position of the intermediate member is referred to the instrument casing (or aircraft structure). Further, the embodiment may include means for temporarily connecting the set-heading indicator mechanically to the intermediate member whereby the set-heading indicator and intermediate member can move only by amounts corresponding respectively to equal changes of course, means for adjusting the indicator and intermediate member when so connected, means for preventing rotation of the repeater compass shaft with respect to the instrument casing (or aircraft structure) during the period that the indicator and intermediate member are mechanically connected, and means for preventing the indicator and intermediate member from being readily adjusted when not mechanically connected.

A third embodiment includes an intermediate member which is permanently connected mechanically to the set-heading indicator and occupies a position with respect to the craft corresponding to the position of the set-heading indicator with respect to the craft, comparator means responsive to the azimuth signal supplied by the reference gyroscope and to the position of the intermediate member for deriving a signal having a component corresponding to the angular position of the set-heading indicator with respect to the repeater compass shaft and a component corresponding to any transient errors in the angular position of the compass shaft due to lag or hunting, and servo means adapted to be temporarily energised to move the course demanding member in response to the signal from the comparator means and including means arranged to delay the response of the servo means to the signal whereby the effect of the transient component is minimised and the servo means responds virtually to the first mentioned component alone and moves the course-demanding member into a position corresponding to the relative angular positions of the set-heading indicator and the repeater compass shaft.

Any embodiment of the invention may include a magnetic compass device adapted to subject the reference gyroscope to long term monitoring control. This device may apply to the reference gyroscope a monitoring signal which is a measure of the difference between the aircraft heading as sensed by the magnetic compass and the aircraft heading indicated by the repeater compass. Preferably the servo means operating the repeater compass includes provision for adjusting the angular position of the repeater compass shaft which corresponds to the heading of the craft measured by reference to the angular position of the reference gyroscope whereby the system comprising the reference gyroscope, the monitoring magnetic compass device and the repeater compass can be adjusted to give and maintain a substantially correct reading with the gyroscope in an arbitrary orientation with respect to the magnetic North, while means is also provided for correspondingly adjusting the angular relation between the orientation of the gyroscope and the course along which the aircraft is steered by the automatic pilot.

In order that the invention may be clearly understood and readily carried into effect, three embodiments thereof will now be described by way of example with reference to the accompanying drawings.

Figure 2:
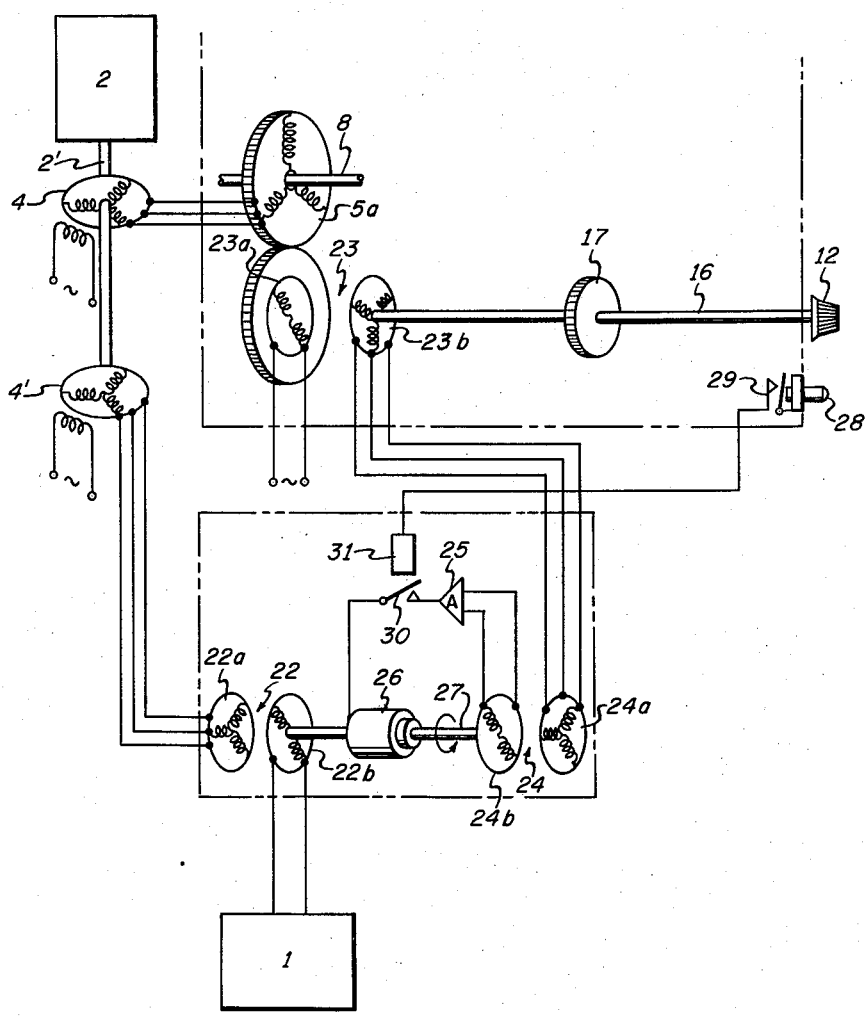
Figure 3:
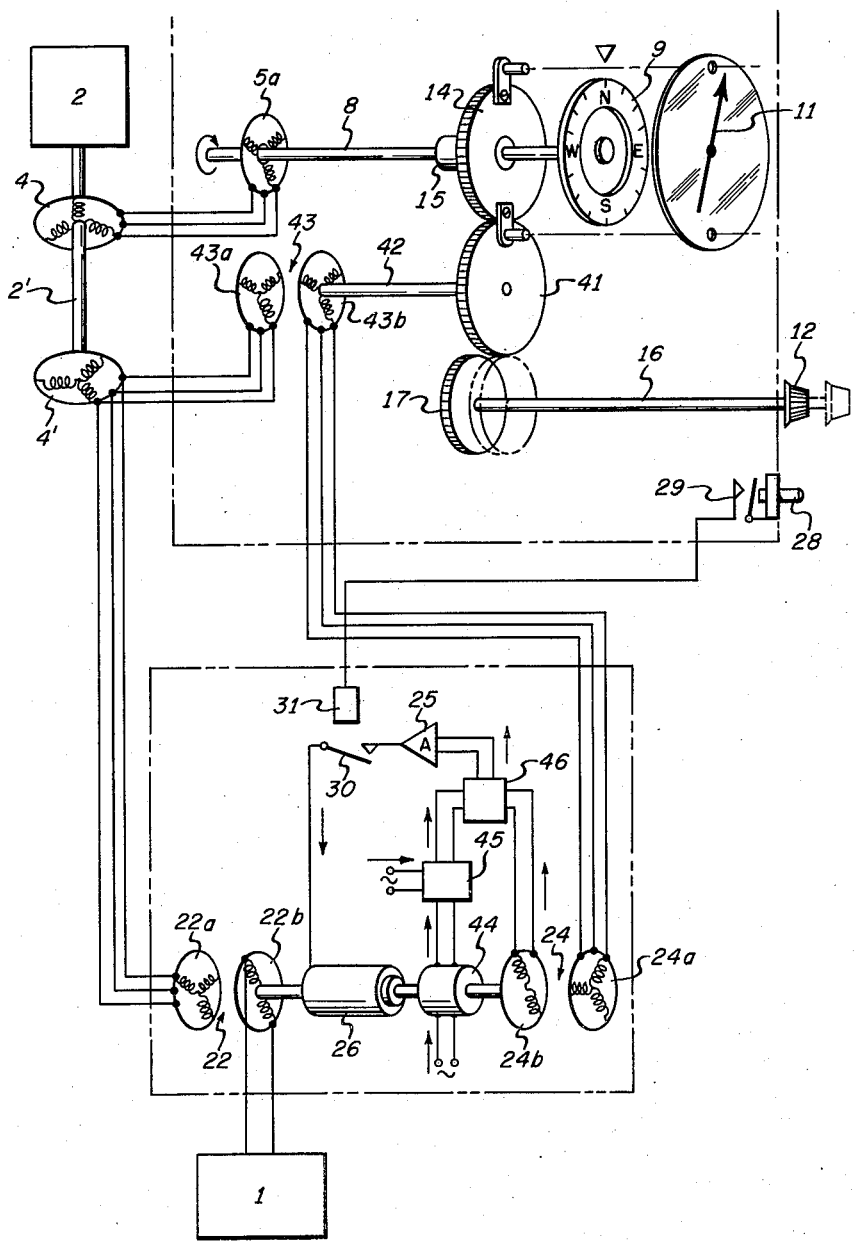

In the drawings, Fig. 1 shows somewhat diagrammatically an embodiment of the invention in which the automatic pilot, if operating, flies the craft along the course indicated by the desired-course indicating means as soon as the latter has been adjusted. Figs. 2 and 3 respectively show diagrammatically two embodiments of the invention which include provision for setting the desired-course indicating means in advance, and subsequently causing the automatic pilot to change the course flown to that corresponding to the setting of the desired-course indicating means.

Referring now to Fig. 1 the apparatus there shown has three principal parts; an automatic pilot 1 capable of automatic control of the heading of the aircraft about the azimuth axis in dependence on heading data supplied to it, a reference gyroscope 2 which supplies data concerning the aircraft's heading, and a heading-indicating instrument 3 on the instrument panel.

This indicating instrument is essentially a servo-operated repeater compass. The reference gyroscope is a conventional directional gyro, the vertical ring of which is supported for rotation about the craft's vertical axis by a suitable trunnion 2' and bearings (not shown) and supplies the repeater compass 3 with heading data consisting of a set of three A.-C. line voltages produced by a conventional synchro transmitter 4 having an excited single phase rotor (not shown) and a three phase stator. A gyro and transmitter of this character is shown in more detail in applicant's assignee's U.S. Patent 2,539,411. These varying voltages are received by the stator winding 5a of the signal receiver 5 in the repeater compass, the rotor 5b of the signal receiver providing an output voltage variable with the angular position of the rotor with respect to its stator. This output voltage, through an amplifier 6, controls a servo motor 7 geared to turn the compass repeater shaft 8, and with it the rotor 5b of receiver 5 to cause the latter to follow changes of heading of the aircraft. The servo-operated compass shaft 8 produces rotation of a compass card 9 which is read in relation to a heading indicating pointer or lubber line 10 which is fixed in relation to the craft.

A set-heading marker or indicator 11 is angularly displaceable on or over the compass card by means of a setting knob 12, and may be set in any position on the card by the pilot to mark the heading that the pilot intends to maintain when he controls the craft manually. In the illustrated embodiment, the set-heading marker 11 is carried on a transparent disc 13 supported on arms extending around the compass cord from a gear 14 fixed to a sleeve 15 rotatable on the compass shaft 8. Gear 14 is normally held in frictional engagement with compass card 9 as by means of a frictional engagement 15' between the hub 15 and repeater shaft 8 so that the set-heading marker 11 and the compass card 9 normally turn together when the aircraft changes its heading but which may be readily slipped against the loading on shaft 8 by large reduction gearing, schematically illustrated at 7', between motor 7 and shaft 8.

For the purpose of indicating a desired course to be steered, the knob 12 is pulled out along the axis of its shaft 16 to bring gear 17 into the position shown by dotted lines where it is in engagement with gear 14, whereupon turning of the knob 12 produces relative rotational movement between gear 14 and shaft 8 and therefore between compass card 9 and heading set indicator 11 against the action of the slip friction clutch. Gears 14 and 17 are of the same size so as to give a gear ratio of 1:1.

It is to be noted that, since the aircraft's heading is indicated by pointer 10 on compass card 9, and the set heading is indicated by marker 11 on compass card 9, angular departure of the aircraft from the set heading is indicated as the angular difference between the positions of the pointer 10 and the set-heading marker 11. This fact could be made use of in a known manner by providing a two-part heading pick-off device in the form of an annular potentiometer winding surrounding shaft 8 and fixed in the instrument housing, and a wiper arm attached to sleeve 15. The wiper arm would pick off from the potentiometer a voltage that is variable in dependence on departure of the set-heading pointer 11 from the lubber line 10, and is zero when the pointer and lubber line coincide. Alternatively, a synchro type device could be used to produce such a voltage. This voltage could then be used as the heading error signal used in the heading control arrangements of the automatic pilot.

However, it will be clear that a heading error signal derived in the known manner described above would be directly dependent not upon the angular position of the reference gyroscope in relation to the craft, but upon the angular position of the servo-motor controlled repeater compass. Thus the inevitable lag which occurs in the operation of the servo motor 7, and possible hunting as well, would result in errors in the heading signal used by the automatic pilot.

The present invention provides for simultaneously changing the set heading marker and the course demanded of the automatic pilot by precisely equal angles, without, however, making the operation of the automatic pilot subject to transient errors occurring in the repeater compass.

To this end, in the embodiment now being described, the heading setting knob 12, in addition to producing relative rotation between the set-heading marker 11 and the compass card 9, turns a course-demanding member constituted by the rotor 21b of a selsyn differential 21, or so-called differential synchro, the stator 21a of which received heading data from a synchro transmitter 4' similar to the transmitter 4, and, like the latter, driven by the vertical trunnion 2' of reference gyroscope 2. The multiple, i.e. 3-line, output voltages of the differential synchro 21 are passed from the rotor 21b of the synchro to the stator winding 22a of a receiving synchro 22 at the automatic pilot 21, and the signal output from the rotor winding 22b of this synchro is applied as an error signal to the automatic pilot.

Since, as already explained, gears 14 and 17 are actually of the same size, the rotation of the knob 12 when gears 14 and 17 are engaged, will result in equal angular motions of rotor 21b and set-heading marker 11 with respect to the instrument casing. But what is required is that the angular motion of set heading marker 11 with respect to shaft 8 should be equal to the angular motion of rotor 21b with respect to the casing. To ensure that correspondence between the angular relation of rotor 21b with respect to the instrument casing and the angular relation of marker 11 with respect to shaft 8 is maintained, it is necessary to ensure, on the one hand, that shaft 8 cannot rotate while gears 17 and 14 are in engagement, and on the other hand, that rotor 21b cannot be rotated while gears 17 and 14 are disengaged.

Conveniently a switch 6' operated by the pulling out of knob 12 is arranged to disconnect servo motor 7 from amplifier 6 before gears 17 and 14 come into engagement. If necessary, automatic braking means (not shown) may be arranged to be applied to shaft 8 at the same time. Suitable mechanical means (not shown) may also be provided for preventing the rotation of rotor 21b by the rotation of knob 12 until knob 12 has been drawn out far enough to put gears 14 and 17 into engagement.

It can be seen that the setting knob 12 sets the zero of the heading error signal used in the automatic pilot (by turning the rotor 21b of the differential synchro 21) in relation to heading data derived electrically directly from the synchro transmitter 4' at the reference gyroscope 2. The setting of rotor 21b in relation to stator 21a is established by establishing a corresponding setting of set heading marker 11 in relation to compass card 9. Thus neither the initial setting of the course to be steered by the automatic pilot, nor the subsequent steering of the craft is dependent on the accurate operation of servo motor 7. Since the heading-error signal used is independent of the lag of servo motor 7 and compass shaft 8, larger lags can be tolerated and the accuracy requirements in the design of the servo system 5, 6, 7 can be relaxed in relation to what is necessary if steering is controlled directly through the compass repeater shaft 8.

The reference gyroscope 2 is subjected to long term monitoring control from a magnetic compass device 32 which constitutes, with the reference gyroscope 2 and indicator 3, a gyro-magnetic compass system. The magnetic compass device 32 is of the saturable-inductor, or flux valve type as shown in the above-mentioned patent. The control of the gyroscope is effected by means of data signals transmitted from the flux valve 32 to the stator 33a of synchro receiver 33 whose rotor winding 33b (on compass shaft 8) provides a misalignment signal via leads 34, 35 to precess the reference gyroscope 2, and, via leads 36, to actuate a misalignment indicator or annunciator 37. The gyroscope 2 is therefore controlled to maintain a predetermined angular relation to the magnetic meridian and the repeater compass is controlled correspondingly.

In the embodiment shown, the repeater compass card 9 is controlled to indicate magnetic North correctly, even though the gyroscope 2 may have some arbitrary orientation. To permit this to occur, the stator 5a is rotatably mounted about the axis of compass shaft 8, and a compensating shaft 38 turnable by knob 39 is geared to it by gear 40. When the apparatus is switched on, the reference gyroscope 2 will, in general, have some arbitrary orientation. Knob 39 is then turned, causing the servo motor to operate correspondingly, until indicator 37 shows that compass card 9 is correctly orientated in relation to the reading of magnetic compass device 32. Thereafter, the gyroscope will be maintained in its initial arbitrary orientation with respect to the magnetic North, and the reading of the card 9 will continue to correspond with the mean reading of compass 32. Actually, the above provides a means for quickly synchronizing the compass card 9 with the magnetic heading without the necessity of waiting for the flux valve to slowly slave the gyro to the magnetic meridian.

This provision for compensating for angular offset of the gyroscope by means of the compensatory rotation introduced by shaft 38 renders desirable the making of further provision to enable rotation of shaft 38 to affect the heading signal used in the automatic pilot to compensate the heading signal for the angular offset of the gyroscope. Thus shaft 38 is geared not only to turn stator 5a but also to turn stator 21a of the synchro differential 21. The gear ratio between stators 5a and 21a is 1:1. Since the adjustment carried out by knob 39 thus results in equal adjustments in the angular position of rotor 21b relative to stator 21a of the synchro differential, the data supplied by rotor 21b are a measure of the discrepancy between the actual and desired headings of the aircraft.

Fig. 2 illustrates a modification of the Fig. 1 embodiment, certain parts not affected by the modification being omitted. The heading-setting knob 12, in addition to setting the heading-setting marker 11 via gear 17, turns an intermediate member constituted by the rotor 23b of a transmitting synchro 23. The signals from this synchro are applied to the stator 24a of a receiving synchro 24 the rotor 24b of which provides an output signal, which, after amplification at 25, controls a servo motor 26 which turns the rotor 24b of the synchro 24 to a position defined by the signals from transmitter 23. Thus the shaft 27 of the synchro rotor 24b reproduces the angular displacements of knob 12. As in Fig. 1 embodiment the heading-error signal for the automatic pilot 1 is obtained from the rotor of a signal-receiving synchro 22 whose stator 22a is connected to receive heading signals derived electrically directly from the transmitter 4' at the reference gyroscope.

The rotor 22b in Fig. 2 is angularly positioned by shaft 27, and is therefore set in accordance with the heading set by knob 12. In order to ensure that hunting of the servo motor 26 is prevented, it may be necessary to arrange for the servo motor 26 to turn not only the selsyn rotors 22b and 24b, but a tachogenerator (not shown). The signal output from the tachogenerator is passed to a signal mixing circuit (also not shown) where it is combined with the output of selsyn rotor 24b for application to the amplifier 25.

This embodiment provides for presetting a future heading by knob 12, and marking this on compass card 9 while the aircraft is still following a present heading, and subsequently operating a separate turn-order controller 28 to initiate the change to the new heading. For this purpose, the control circuit for operating servo motor 26 is normally broken at relay contacts 30 controlled by relay 31. Relay 31 is operated from the turn-order controller 28. This turn-order controller is a push-button that closes contacts 29 and energises relay 31 and thus make the contacts 30. The essence of this feature is the transmission of the set heading data as multiple voltages to a synchro to control a repeater shaft to assume an angular position corresponding to the set-heading data. Shaft 27 introduces the set-heading data into the automatic pilot.

In the embodiment described with reference to Figs. 1 and 2, the member 21b or 22b the position of which determines the course demanded of the automatic pilot is adjusted independently of the angular position of the shaft 8, so that neither the accuracy of the original setting of the member 21b or 22b, nor the accuracy with which the desired course is subsequently steered, is dependent upon the accurate response of servo motor 7.

In the embodiment next to be described with reference to Fig. 3, adjustment of a member determining the course demanded of the automatic pilot is not independent of the angular position of the shaft 8. Means is provided for minimising the effect of lag or hunting in the repeater compass servo motor, and the repeater compass remains in normal operation during the setting period, instead of being rendered inoperative as in the two preceding embodiments. Once the course demanding member is set into a new position, the accuracy with which the course corresponding to the new position is steered is independent of the operation of the repeater-compass servo motor.

This third embodiment has the servo motor control of shaft 8, and the monitoring of the gyroscope by the flux valve as in the two preceding embodiments, with the exception that no switch or other means is provided for preventing rotation of the servo compass shaft during the setting of the apparatus for a new course as in Figs. 1 and 2. The servo motor 7, and other components, are omitted from Fig. 3 to simplify the drawing.

The gear 14 on sleeve 15 is permanently in mesh with a gear 41 on lay shaft 42, and the heading setting knob 12 turns a gear 17 which is engageable with gear 41 instead of directly with gear 14, to turn gear 14, sleeve 15, and set-heading marker 11 with respect to compass shaft 8. Gears 14 and 41 are of the same size. Shaft 42 also turns the rotor 43b of a synchro differential 43 whose stator 43a received heading data signals from the synchro transmitter 4' on the gyro trunnion. The stator 43a and stator 5a are geared together and are rotatable by means not shown to provide for correct operation of the apparatus with the reference gyroscope 2 orientated in an arbitrary compass direction, in the general manner described with reference to Fig. 1.

The synchro differential 43 constitutes comparator means for comparing the orientation of the reference gyroscope, after applying the correction to relate this orientation to the compass direction, with the position of the intermediate member constituted by the rotor 43b of the synchro differential.

As in the embodiment of Fig. 2, the automatic pilot does not control the craft to fly along the course set by operating knob 12 until the turn order control switch 28 is operated to energise relay 31 and cause servo motor 26 to set the selsyn rotor 22b in an appropriate position in response to the out-put of synchro differential 43.

Now if the shaft 8 were to be moved appropriately by its servo motor (not shown) without any lag or hunting, the virtual rotation of the heading data signals applied to stator 43a and the mechanical rotation of rotor 43b which occurred during any change of course would be equal and synchronous, so that the output from the windings of rotor 43b when the knob 12 is not being operated would be a constant signal equivalent to the output of winding 23b in the Fig. 2 embodiment. This signal could be used in the same way to control a servo motor to position a selsyn rotor 22b to determine the course demanded of the automatic pilot.

In practice, the output of rotor 43b can be regarded as having a constant component which is a measure of the angular position of the marker 11 with respect to the compass card 9, and an additional component which is a measure of the transient error in the reading of the repeater compass due to lag, and possibly hunting, in the operation of the servo motor controlling shaft 8. Owing to the existence of this transient, erroneous, component, the arrangement employed in the Fig. 2 embodiment for positioning the selsyn rotor 22b would prove inadequate. The arrangement therefore has to be modified by including a tachogenerator 44 which turns with the selsyn rotors 22b and 24b. The signal output from this tachogenerator is passed through a limiter 45 and then to a signal mixing circuit 46, where it is combined with the output of selsyn rotor 24b for application to the amplifier 25.

The tachogenerator 44, while it prevents hunting of the servo motor 26, serves primarily to minimise the effect of the transient heading-data error arising on changes in heading of the aircraft and due to lags and possibly also to hunting in the operation of the follow-up servo motor 7 of the indicating instrument. In order to deal with this transient error, a much larger negative feedback tachogenerator signal is used in the system of Fig. 3 than is required merely for the purpose of damping servo motor 26. For example, at low speeds corresponding to small input signals to the amplifier 25 from the selsyn rotor 24b the effect is that the speed of the servo motor 26 is rendered very much slower than is necessary for rapid following of the input signal without hunting. In fact, the servo motor with tachogenerator feedback into the amplifier becomes a smoothing device having a time constant sufficient to smooth out the transient errors so that the output rotation of the servo-motor shaft is substantially a measure of the constant component of the signal.

The function of the limiter 45 is to ensure that while the large time constant in the delay response of the servo motor 26 to the input signal when this signal is small should substantially smooth out the transient errors, yet there should not be too much delay in the response of the system to a change in the set heading. Changes in the set heading are usually made through angles which are large compared with the transient errors in the set-heading data signals which result from such yawing of the aircraft as obtains during automatic control. The limiter is set so as to exercise no limiting action on the tachogenerator signals produced in response to the low speeds of the servo motor 26 resulting from the application of the transient error signals, but to limit tachogenerator signals of larger magnitudes corresponding to higher speeds of the servo motor.

When a change of heading is set, the tachogenerator signal, after being limited by the limiter, will be generally too small effectively to oppose, in the mixing circuit 46, the change of the set-heading signal, so that the set-heading signal will be fully effective to drive the servo motor 26 rapidly. The output shaft of the motor 26 will therefore turn rapidly through an angle approximately equal to the change in the set heading and then slowly into an angular position which conforms more precisely to the set heading as the smoothing action of the tachogenerator becomes effective.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic pilot for aircraft having a directional gyro and a magnetic compass for controlling the direction of flight of the aircraft, the combination comprising, a compass indicator for normally indicating the magnetic heading of the aircraft, servomotor means connected to position said compass indicator in accordance with the short term output of said gyro and the long term output of said magnetic compass, said servomotor means inherently introducing transients in the positioning of said indicator in response to the operation of said gyro and compass, a settable heading selector positionable with respect to said indicator for providing an indication of the desired heading, a signal transmission channel connected between said gyro and automatic pilot for directly controlling the heading of said craft in accordance with the output of said gyro, and means coupled with the heading selector for modifying the output of said gyro through said signal transmission channel only in accordance with the operation of said heading selector, whereby to render said automatic pilot unresponsive to any transients in the operation of said servomotor means.

2. Apparatus as set forth in claim 1 wherein said last-mentioned means comprises means responsive to the positioning of said heading selector for rendering said servomotor means inoperative.

3. Apparatus as set forth in claim 1 wherein said last-mentioned means comprises means for rendering said servomotor means inoperative upon positioning of said heading selector and signal generating means controlled by the setting of said heading selector for producing a signal proportional to the difference between the existing heading of the craft and a selected heading, and means responsive to said signal for modifying the output of said gyro through said signal transmission channel in accordance therewith.

4. Apparatus as set forth in claim 3 wherein said means responsive to said signal comprises a further follow-up servomotor positioned in accordance with said signal, and means responsive to said servomotor for modifying the output of said gyro through said signal transmission channel.

5. Apparatus as set forth in claim 1 wherein said last-mentioned means comprises a follow-up servomotor loop having an input variable in accordance with the operation of said heading selector and said indicator servomotor means, said servomotor loop having a time constant which is slow as compared with the time constant of said indicator servomotor means, whereby the former is rendered unresponsive to transients in the operation of the latter, and means responsive to the operation of said servo loop for modifying the output of said gyro through said signal transmission channel.

6. In an automatic pilot for aircraft having a directional gyro and a magnetic compass for controlling the direction of flight of the aircraft comprising, a compass indicator for normally indicating the magnetic heading of the aircraft, means coupled therewith for positioning the same in accordance with the short term output of said gyro and the long term output of said magnetic compass, a settable heading selector for preselecting a heading different from the actual heading, and signal producing means operable thereby for producing a signal in accordance with the setting thereof, a signal transmission channel connected between said gyro and automatic pilot for directly controlling the heading of said craft in accordance with the output of said gyro, means adapted to be operated in accordance with said heading selector signal for modifying the output of said gyro through said signal transmission channel, whereby upon operation thereof to cause said craft to turn to said selected heading, and means operable at will for rendering said signal modifying means effective.

7. Apparatus as set forth in claim 6 wherein said signal modifying means includes a servo loop responsive to said difference signal and switch means operable at will for rendering said servo loop responsive to said difference signal.

8. Aircraft navigation apparatus comprising an azimuth reference instrument for providing data concerning the aircraft's heading, automatic pilot means responsive to the reference instrument for controlling the steering of the aircraft, an adjustable course demanding member arranged to determine by the position into which it is adjusted the course steered by the automatic pilot means, a course pre-setting member manually adjustable into one of a plurality of positions representing courses which can be steered by the automatic pilot means, indicating means for indicating the course corresponding to the position in which the course pre-setting member is set, servo means for adjusting the course demanding member automatically into a position corresponding to the position of the course pre-setting member, and means for bringing the servo means into operation at any desired moment subsequent to the adjustment of the course pre-setting member.

9. Aircraft navigation apparatus as claimed in claim 8 including means for referring the position into which the course demanding member is adjusted to the aircraft.

10. Aircraft navigation apparatus as claimed in claim 8 including means for referring the position into which the course precessing member is adjusted to the aircraft.

11. Aircraft navigation apparatus as claimed in claim 8 including means for referring the position into which the course precessing member is adjusted to a variable position in the aircraft which is a measure of the aircraft heading.

12. Aircraft navigation apparatus as claimed in claim 8 in which the servo means for adjusting the course demanding member includes means for operating in a sense that controls the automatic pilot means to turn the aircraft in the direction providing the shorter turn onto the new course.

13. Aircraft navigation apparatus as claimed in claim 8 in which the servo means includes means for moving the course demanding member at a mean rate less than the rate corresponding to the maximum turning rate of the aircraft when under the control of the automatic pilot means whereby the servo means determines the rate at which the aircraft turns onto the new course.

References Cited in the file of this patent

UNITED STATES PATENTS

| | | |
|---|---|---|
| 2,772,059 | Noxon | Nov. 27, 1956 |
| 2,855,558 | Fragola | Oct. 7, 1958 |